(12) United States Patent
Sahin et al.

(10) Patent No.: US 10,985,958 B2
(45) Date of Patent: Apr. 20, 2021

(54) REFERENCE SIGNAL-FREE TRANSMISSION FOR WIRELESS SYSTEMS

(71) Applicant: IDAC Holdings, Inc., Wilmington, DE (US)

(72) Inventors: Alphan Sahin, Westbury, NY (US); Erdem Bala, East Meadow, NY (US); Rui Yang, Greenlawn, NY (US); Mihaela C. Beluri, Jericho, NY (US); Moon-il Lee, Melville, NY (US); Janet A. Stern-Berkowitz, Little Neck, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/337,746

(22) PCT Filed: Sep. 19, 2017

(86) PCT No.: PCT/US2017/052212
§ 371 (c)(1),
(2) Date: Mar. 28, 2019

(87) PCT Pub. No.: WO2018/063855
PCT Pub. Date: Apr. 5, 2018

(65) Prior Publication Data
US 2019/0245725 A1 Aug. 8, 2019

Related U.S. Application Data

(60) Provisional application No. 62/400,911, filed on Sep. 28, 2016.

(51) Int. Cl.
*H04L 27/26* (2006.01)
*H04L 5/00* (2006.01)
(Continued)

(52) U.S. Cl.
CPC .............. *H04L 27/261* (2013.01); *H04L 1/08* (2013.01); *H04L 5/0007* (2013.01);
(Continued)

(58) Field of Classification Search
CPC . H04L 1/08; H04L 5/0007; H04L 5/02; H04L 5/22; H04L 25/03127;
(Continued)

(56) References Cited

U.S. PATENT DOCUMENTS 9,544,171 B2 * 1/2017 Berardinelli ...... H04L 25/03343
9,544,173 B1 * 1/2017 Berardinelli ........ H04L 27/2613
(Continued)

FOREIGN PATENT DOCUMENTS

WO    WO 2016/124663 A1    8/2016

OTHER PUBLICATIONS

Berardinelli et al, Reference Sequence design for Zero-Tail DFT-spread-OFDM, IEEE, 6 pages, 2016.*
(Continued)

*Primary Examiner* — Frank Duong
(74) *Attorney, Agent, or Firm* — Condo Roccia Koptiw LLP

(57) ABSTRACT

Systems, methods, and instrumentalities are disclosed for separating a channel and data without the use of reference signals. For example, a wireless transmit/receive unit (WTRU) may determine a first orthogonal frequency-division multiplexing (OFDM) symbol based on a data vector. The WTRU may determine a second OFDM symbol by applying a circular time-inverse operation and a conjugate operation to the first OFDM symbol. The WTRU may send the first OFDM symbol and the second OFDM symbol. The first and the second OFDM symbols may be sent to consecutively. Discrete Fourier Transform (DFT)-spread and nonlinear preprocessing (exponential transformation at the
(Continued)

transmitter) may be used and/or peak-to-average power ratio (PAPR) may be reduced via randomizer block at the receiver.

18 Claims, 9 Drawing Sheets

(51) Int. Cl.
*H04L 25/03* (2006.01)
*H04L 1/08* (2006.01)
(52) U.S. Cl.
CPC .. *H04L 25/03127* (2013.01); *H04L 25/03133* (2013.01); *H04L 27/2626* (2013.01); *H04L 27/2628* (2013.01); *H04L 27/2636* (2013.01)
(58) Field of Classification Search
CPC . H04L 25/03133; H04L 27/26; H04L 27/261; H04L 27/2626; H04L 27/2628; H04L 27/2636
See application file for complete search history.

(56) References Cited

U.S. PATENT DOCUMENTS

| | | | | |
|---|---|---|---|---|
| 9,571,140 | B2* | 2/2017 | Thomas | H04B 1/0483 |
| 9,967,122 | B2* | 5/2018 | Park | H04L 27/2605 |
| 10,129,065 | B2* | 11/2018 | Sahin | H04L 25/03834 |
| 10,284,407 | B2* | 5/2019 | Bala | H04L 27/2627 |
| 10,536,312 | B2* | 1/2020 | Pan | H04L 27/2607 |
| 2016/0233899 | A1 | 8/2016 | Thomas et al. | |
| 2018/0198662 | A1* | 7/2018 | Sahin | H04L 27/2605 |
| 2018/0316537 | A1* | 11/2018 | Haghighat | H04L 5/0039 |
| 2018/0375707 | A1* | 12/2018 | Bala | H04L 27/2627 |

OTHER PUBLICATIONS

Sahin et al, Flexible DFT-S-OFDM: Solutions and Challenges, IEEE, 7 pages, 2016.*
Kumar et al, A Waveform for 5G: Guard Interval DFT-s-OFDM, IEEE, 6 pages, 2015.*
Huemer et al, Design and analysis of UW-OFDM signals, Elsevier, 11 pages, 2014.*
Ciochina et al., "New PAPR-Preserving Mapping Methods for Single-Carrier FDMA with Space-Frequency Block Codes", IEEE Transactions on Wireless Communications, vol. 8, No. 10, Oct. 2009, pp. 5176-5186.
Fan et al., "Pilot-Aided Channel Estimation Schemes for OFDM Systems with Cyclic Delay Diversity", IEEE 69th Vehicular Technology Conference; Barcelona, Spain, Apr. 2009, pp. 1-5.
Huang et al., "Block Spread OFDMA with STC MIMO for Improved Frequency and Spatial Diversity over Broadband Wireless Access Uplink", IEEE Wireless Communication and Networking Conference, Sydney, NSW, 2010, 6 pages.
Oppenheim et al., "Discrete-Time Signal Processing", Chapter 13, Prentice Hall, 2010, 54 pages.
Oppenheim et al., "From Frequency to Quefrency: A History of the Cepstrum", IEEE Signal Processing Magazine, vol. 21, No. 5, Sep. 2004, pp. 95-99, 106.

* cited by examiner

REFERENCE SIGNAL-FREE TRANSMISSION FOR WIRELESS SYSTEMS

CROSS-REFERENCE

This application is the National Stage entry under 35 U.S.C. § 371 of Patent Cooperation Treaty Application PCT/US2017/052212, filed Sep. 19, 2017, which claims the benefit of U.S. Provisional Application No. 62/400,911, filed on Sep. 28, 2016, which is incorporated herein by reference as if fully set forth.

BACKGROUND

In Long Term Evolution (LTE), orthogonal frequency-division multiplexing (OFDM) may be used for downlink (DL) transmission. Discrete Fourier Transform spread OFDM (DFT-s-OFDM) may be used for uplink (UL) transmission. In a cyclic prefix (CP) DFT-s-OFDM, the data symbols may be spread with a DFT block, and may be mapped to the corresponding inputs of an inverse DFT (IDFT) block. The CP may be prepended to the beginning of the symbol to avoid inter-symbol interference (ISI) and allow one-tap frequency domain equalization (FDE) at the receiver. A cyclic prefix (CP) DFT-s-OFDM may be referred to as single carrier (SC) frequency-division multiplexing (SC-FDMA) with multiple accessing.

In conventional wireless systems, including LTE, reference symbols may be used to estimate the channel and equalize the received signals. Common reference symbols may be transmitted on subcarriers distributed over the system bandwidth. WTRU-specific reference signals may be distributed over the sub-band that is allocated to a specific user equipment (UE).

SUMMARY

Transmission techniques that allow receivers to decode information via cepstral transformation may be provided. For example, systems, methods, and instrumentalities are disclosed for separating a channel and data without the use of reference signals. For example, a wireless transmit/receive unit (WTRU) may determine a first orthogonal frequency-division multiplexing (OFDM) symbol based on a data vector. The WTRU may determine a second OFDM symbol by applying a circular time-inverse operation and a conjugate operation to the first OFDM symbol. The WTRU may send the first OFDM symbol and the second OFDM symbol. The first and the second OFDM symbols may be sent to consecutively. Discrete Fourier Transform (DFT)-spread and nonlinear preprocessing (exponential transformation at the transmitter) may be used and/or peak-to-average power ratio (PAPR) may be reduced via randomizer block at the receiver.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1A:
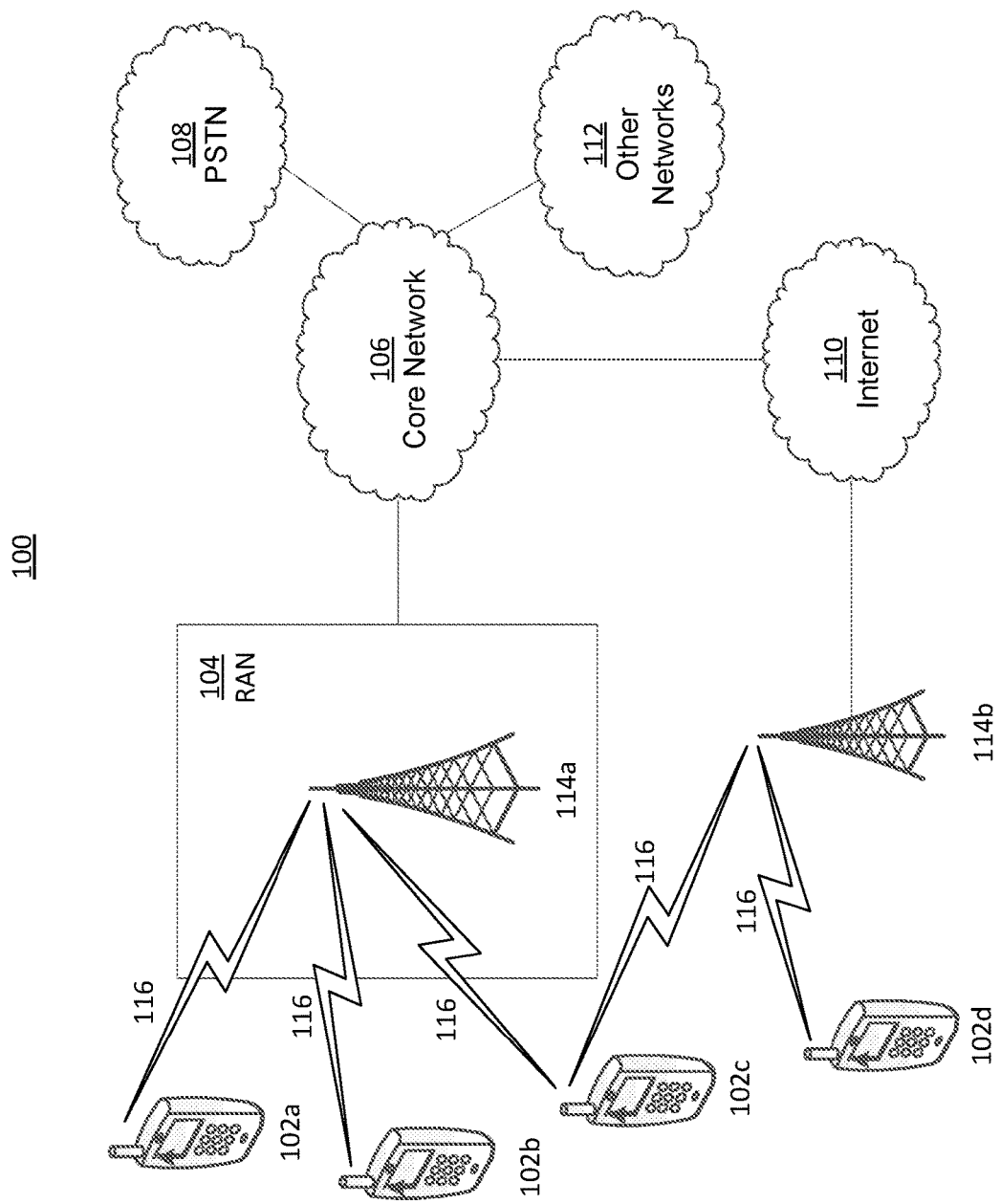
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a 'station' and/or a 'STA', may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
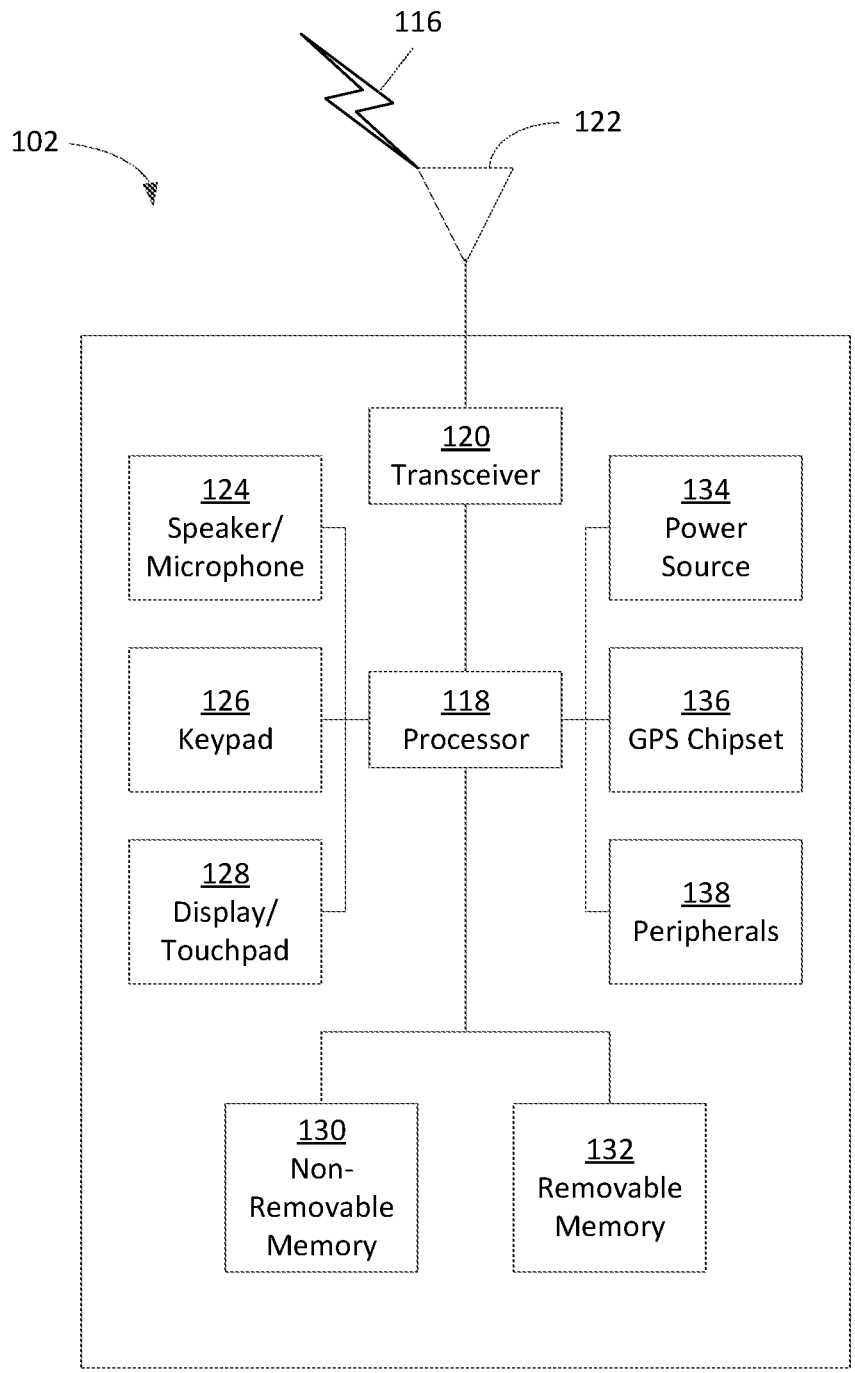
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
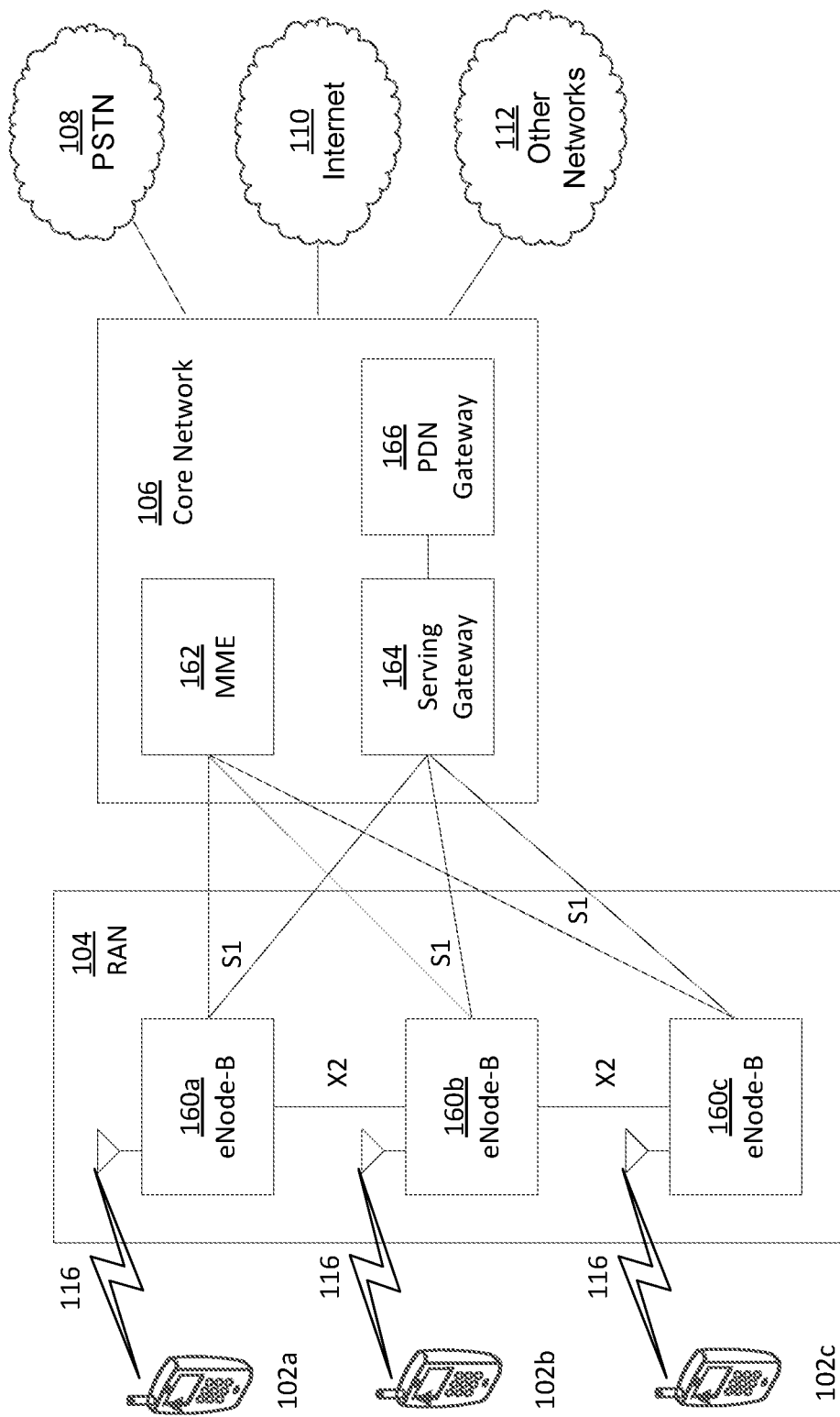
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN. A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
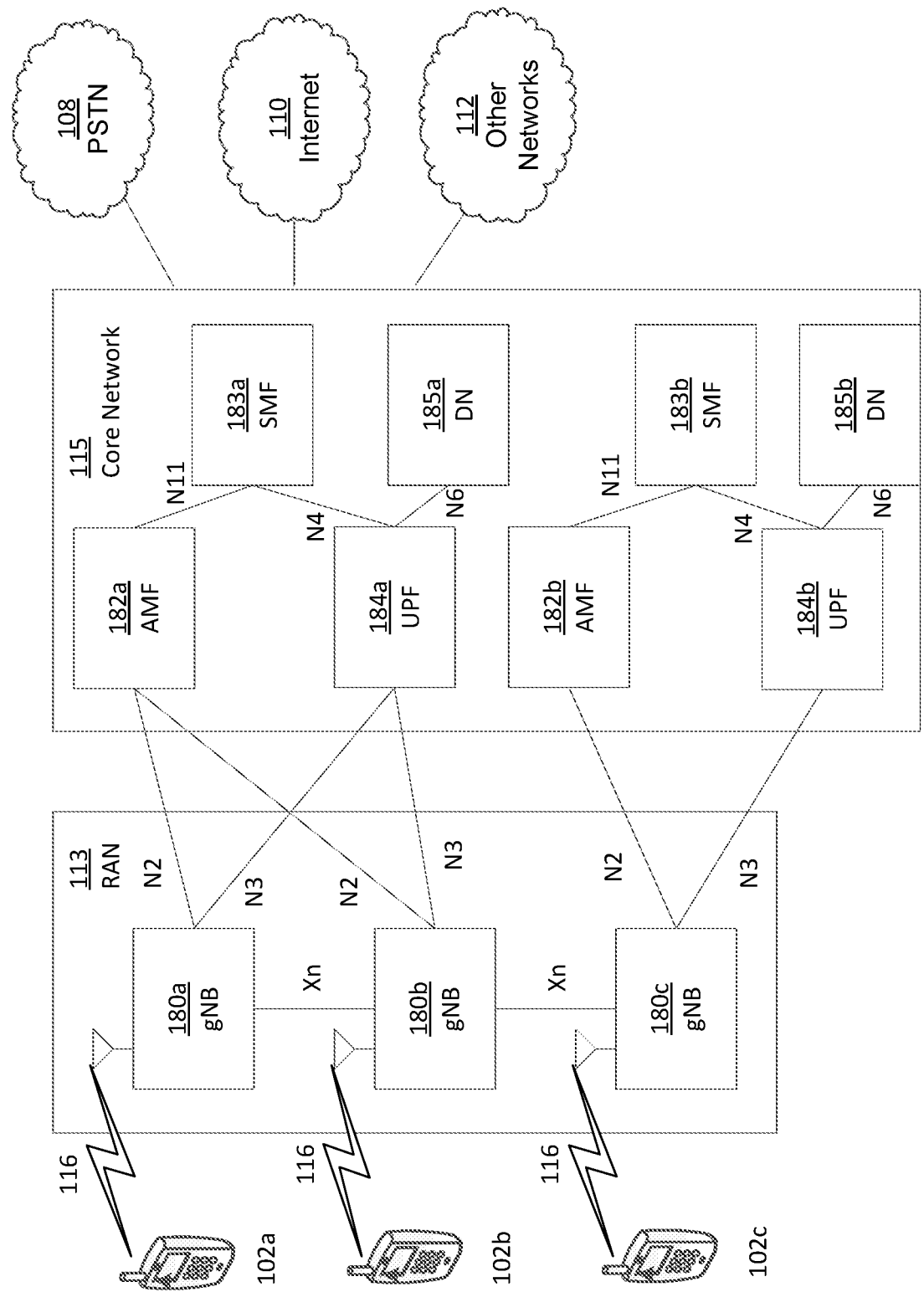
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP addresses, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A wireless communication system called the New Radio (NR) (e.g., 5G NR and/or 5G) may be provided. Applications of NR may include enhanced mobile broadband (eMBB), massive machine-type communications (mMTC), and/or ultra-reliable-and-low-latency communications (URLLC). For mMTC application, NR may support up to 1e6 mMTC devices per km$^2$ with extended coverage, low power consumption, and/or low device complexity. To support high connection density, non-orthogonal multiple access techniques may be used. To increase the spectral efficiency, massive MIMO systems may be deployed. In massive MIMO, a large number of antenna elements may be used for transmission and/or reception of wireless signals.

Homomorphic filtering may include a nonlinear transformation to convert a signal obtained from a convolution of multiple (e.g., two) original signals into the sum of multiple (e.g., two) signals. In speech processing, homomorphic filtering may be applied to separate the filter from the excitation in the source-filter model. The cepstrum may be a homomorphic transformation that may allow for performing such separation. The cepstrum may be defined as the spectrum of the log of the spectrum of a time waveform. In this domain, the channel component may create peaks that may be filtered. Filtering may be referred to as 'liftering' herein.

Channel estimation may be performed by using reference signals (RS). With non-orthogonal multiple access, and/or for massive MIMO systems, the overhead of reference signals may increase, and/or pilot contamination may occur.

One or more transmission techniques may result in the effective channel to be real-valued. The channel and data may be separated. For example, the channel and data may be separated without the use of reference signals.

An OFDM symbol may be represented by a vector $x_t$. An OFDM symbol may be generated by $x_t=CF^Hd$. d may be a data vector, F may be a Fourier matrix, the superscript H may denote a Hermitian operation, and/or C may denote a matrix that represents an addition of a cyclic prefix. x may equal $F^Hd$.

The received signal may be represented as y=x⊛h. For example, at the receiver, after removing the CP, the received signal may be represented as y=x⊛h. ⊛ may denote a circular convolution operator, and/or h may be a channel vector that may be complex valued.

Figure 2:
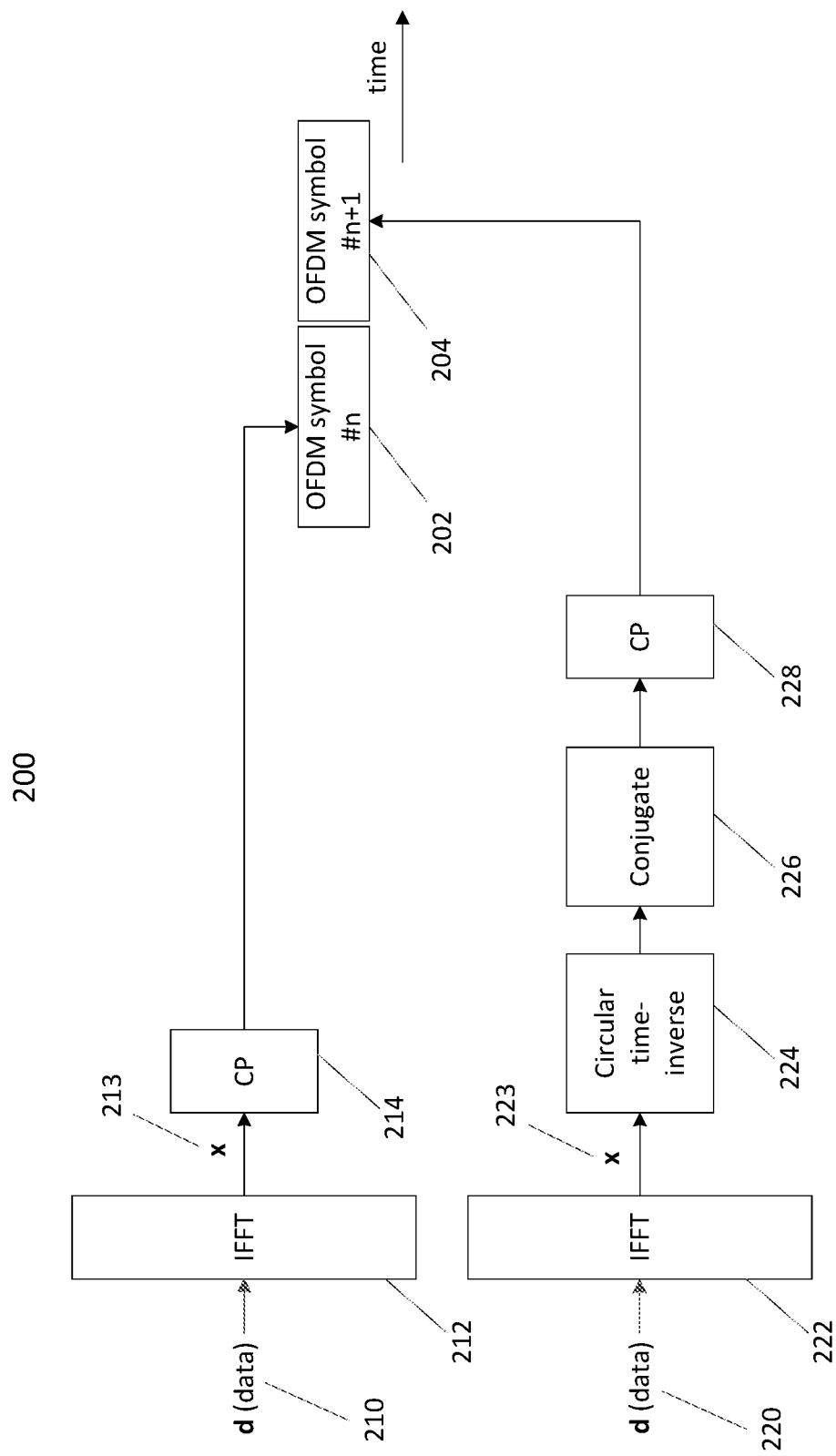
FIG. 2 illustrates an example transmitter.

FIG. 2 illustrates an example transmitter and an example transmission 200. For example, the structures provided in FIG. 2 may be implemented in a transmitter. As shown in FIG. 2, data vector 210 may be processed via an Inverse Fast Fourier Transform (IFFT), for example, via IFFT 212. Data vector 210 may be a data portion of an OFDM symbol. OFDM symbol x 213 may result from data vector 210 being processed via the IFFT 212. OFDM symbol x 213 may be an OFDM symbol without a CP. A CP may be added to OFDM symbol x 213, for example, via CP 214.

A data vector 220 may be processed via an Inverse Fast Fourier Transform (IFFT), for example, via IFFT 222. Data vector 220 may be a data portion of an OFDM symbol. As an example, data vector 220 may be the same as data vector 210. Data vector 220 may be processed via IFFT 222. OFDM symbol x 223 may result from data vector 220 being processed via IFFT 222. OFDM symbol x 223 may be an OFDM symbol without a CP. As an example, OFDM symbol x 223 may be the same as OFDM symbol x 213. A circular time-inverse operation may be applied to OFDM symbol x 223, for example, via Circular time-inverse 224. The conjugate of OFDM symbol x 223 may be determined, for example, via Conjugate 226. A CP may be added to OFDM symbol x 223, for example, via CP 228.

Two OFDM symbols may be transmitted. For example, a first OFDM symbol 202 and a second OFDM symbol 204 may be transmitted. The first OFDM symbol 202 and the second OFDM symbol 204 may be transmitted consecutively. $x_1$ may correspond to OFDM symbol 213. In an example, $x_1$ may equal $x=F^Hd$. $x_2$ may correspond to the conjugate of OFDM symbol x 223, as described herein. In an example, $x_2$ may equal $x(-n)_N^*$. n may denote a sample index, the subscript N may denote a "modulo N" operation, the superscript * may denote a conjugate, and/or N may represent the DFT size. As an example, if $x_1=[a\ b\ c\ d]^T$ (N=4), $x_2$ may equal $[a\ d\ c\ b]^H$. The superscript T may be the transpose operator. As described herein, OFDM symbol x may not include a CP. The CP may be added. For example, the CP may be added to the OFDM symbol x before transmission.

Signal r may be computed. For example, at the receiver, signal r may be computed after removing the CP. r may be equal to $y_1(n)+y_2(-n)_N^*$. $y_1$ may be equal to $x_1 \circledast h_1$, and/or $y_2$ may be equal to $x_2 \circledast h_2$. When the channel does not change (e.g., does not change significantly) over the two OFDM symbols, e.g., $h=h_1=h_2$, r may be equal to $x_1 \circledast h+x_2(-n)_N^* \circledast h(-n)_N^*$, which may be equal to $x \circledast h+x \circledast h(-n)_N^*$, which may be equal to $x \circledast (h+h(-n)_N^*)$.

The DFT of the computed signal r may be determined. For example, after the DFT, a vector v may be derived based on $v=Fr=F\{x \circledast (h+h(-n)_N^*)\}=Fx \odot F(h+h(-n)_N^*)=Fx \odot H_R=d \odot H_R$. $H_R$ may be a real valued channel vector and/or $\odot$ may denote point-wise multiplication.

Figure 3:
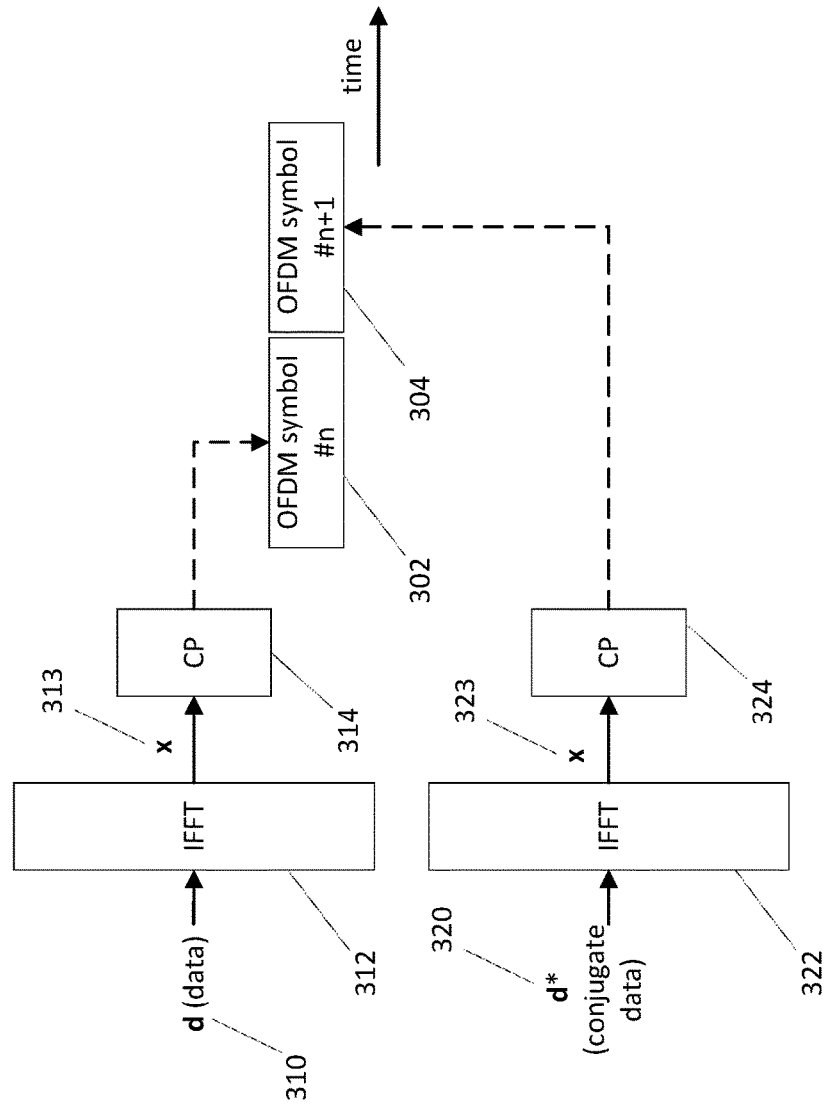
FIG. 3 illustrates an example transmitter.

FIG. 3 illustrates an example transmitter and an example transmission 300. For example, the structures provided in FIG. 3 may be implemented in a transmitter. As shown in FIG. 3, data vector 310 may be processed via an Inverse Fast Fourier Transform (IFFT), for example, via IFFT 312. Data vector 310 may be a data portion of an OFDM symbol. OFDM symbol x 313 may result from data vector 310 being processed via the IFFT 312. OFDM symbol x 313 may be an OFDM symbol without a CP. A CP may be added to OFDM symbol x 313, for example, via CP 314.

Data vector 320 (e.g., d* 320) may be the conjugate of data vector 310. Data vector 320 may be processed via an Inverse Fast Fourier Transform (IFFT), for example, via IFFT 322. Data vector 320 may be a data portion of an OFDM symbol. OFDM symbol x 323 may result from data vector 320 being processed via the IFFT 322. OFDM symbol x 323 may be an OFDM symbol without a CP. A CP may be added to OFDM symbol x 323, for example, via CP 324.

A second OFDM symbol 304 may be used to transmit the conjugate of the data vector 310 transmitted in the first OFDM symbol 302. $x_1$ may correspond to OFDM symbol x 313. $x_2$ may correspond to OFDM symbol x 323. In an example, if $x_1=x=F^Hd$, $x_2$ may be equal to $F^Hd^*$. $x_2$ may be equal to $x(-n)_N^*$.

Figure 4:
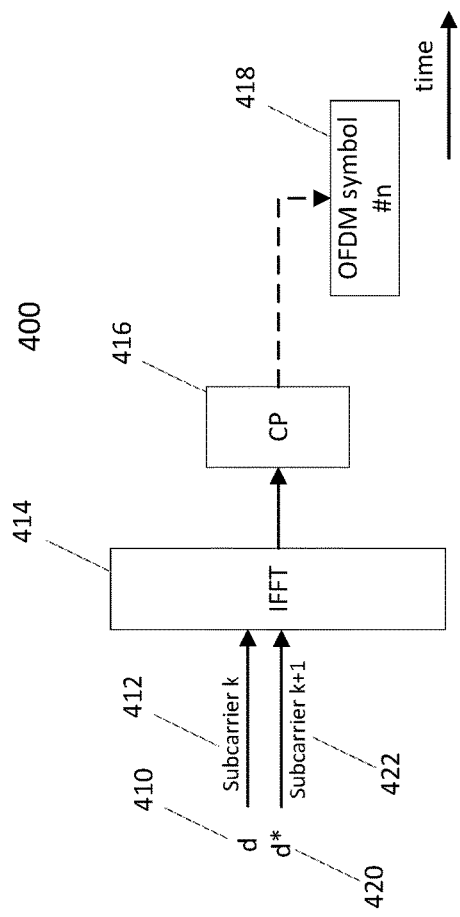
FIG. 4 illustrates an example transmitter.

FIG. 4 illustrates an example transmitter and an example transmission 400. For example, the structures provided in FIG. 4 may be implemented in a transmitter. Data symbol 410 and/or the conjugate 420 of the data symbol 410 may be transmitted on one or more (e.g., adjacent) subcarriers, such as subcarriers 412 and 422. The data symbol and/or the conjugate may be processed via an Inverse Fast Fourier Transform (IFFT). For example, after being transmitted on the one or more subcarriers 412, 422, the data symbol 410 and/or the conjugate 420 may be processed via an Inverse Fast Fourier Transform (IFFT). The data symbol 410 and/or the conjugate 420 may be processed via an Inverse Fast Fourier Transform (IFFT), for example, via IFFT 414. A CP may be added to data symbol 410 and/or the conjugate 420, for example, via CP 416. A OFDM symbol 418 may be used to transmit the data symbol 410 and/or the conjugate 420. At the receiver, after DFT, the received symbols on the two adjacent subcarriers may be given as $R_k=h_k d_k$, and $R_{k+1}=h_{k+1}d_k^*$. If $h_k=h_{k+1}$, $R_k+R_k^*$ may be equal to $(h_k+h_k^*)d_k$. The effective channel $(h_k+h_k^*)$ may be a real valued channel.

Channel impact may be removed from the received signal. For example, the transmitter may generate signals with fast varying components in a domain, such as a spectrum or cepstrum. The generated signals may be random data, independent data symbols, a pre-coded data symbol (e.g., a pre-coded data symbol that may be spread), and the like. The propagation channel may vary slower than the data. The receiver may separate the signal and the channel. For example, the receiver may separate the signal and the channel based on the difference between the variations of the signals and/or the channels. The receiver may remove the impact of the channel. For example, the impact of the channel may be removed from the received signal by using a homomorphic deconvolution technique, such as a complex cepstrum technique.

Figure 5:
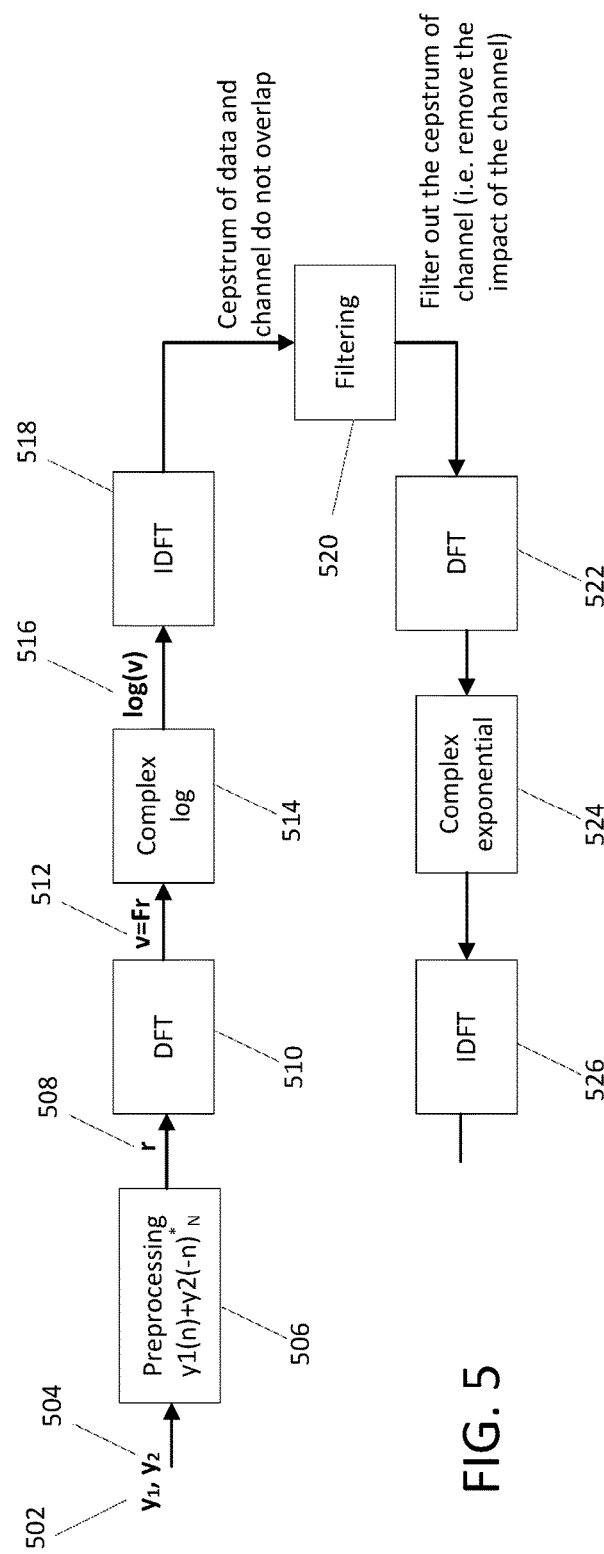
FIG. 5 illustrates example removal of channel impact.

FIG. 5 illustrates an example removal of channel impact. As shown in FIG. 5, two OFDM symbols (e.g., consecutive OFDM symbols), y1 502 and y2 504, may be preprocessed. For example, two consecutive OFDM symbols, y1 502 and y2 504, may be preprocessed via Preprocessing 506. The OFDM symbols may be preprocessed at the receiver. The preprocessing of the OFDM symbols may generate a computed signal r 508, as r=$y_1(n)+y_2(-n)_N$*. The DFT of r 508 may be computed via DFT 510 to determine v 512, wherein v=Fr. The complex logarithm of v 512 may be computed via 514 to determine log[v] 516. An inverse DFT may be computed, for example, via IDFT 518. The inverse DFT may be implemented via an Inverse Fast Fourier Transform (IFFT). The inverse DFT may be used to determine the cepstrum of the input signal r. The channel spectral components may be filtered (e.g., filtered out) via Filtering 520. By following inverse steps, the signal without (or with little) impact of the channel may be restored. The filtered channel spectral components may be processed via a DFT, such as DFT 522. A complex exponential may be determined, via complex exponential block 524, of the values resulting from DFT 522. The complex exponential value may be processed via an inverse DFT, for example, via IDFT 526.

Preprocessing may be performed after computing the DFT of r. For example, preprocessing may operate on an OFDM symbol. An OFDM symbol may be operated on. For example, a single OFDM symbol may be operated on, one at a time. The real valued effective channel may be generated by addition (e.g., proper addition) of the symbols on two subcarriers (e.g., two adjacent subcariers).

The complex log block 514 of FIG. 5 may perform the following operation:

$$r_n = a_{d_n} a_{h_n} e^{j(\phi_{d_n} + \phi_{h_n})} \overset{ln(\cdot)}{\Longrightarrow} \ln(r_n) = \ln(a_{d_n} a_{h_n}) + j(\phi_{d_n} + \phi_{h_n}).$$

The operation may be calculated (e.g., equivalently calculated) as the amplitude of the received signals for $\ln(a_{d_n} a_{h_n})$ and the angle of the received signal for the imaginary component of $(\phi_{d_n} + \phi_{h_n})$.

Figure 6A:
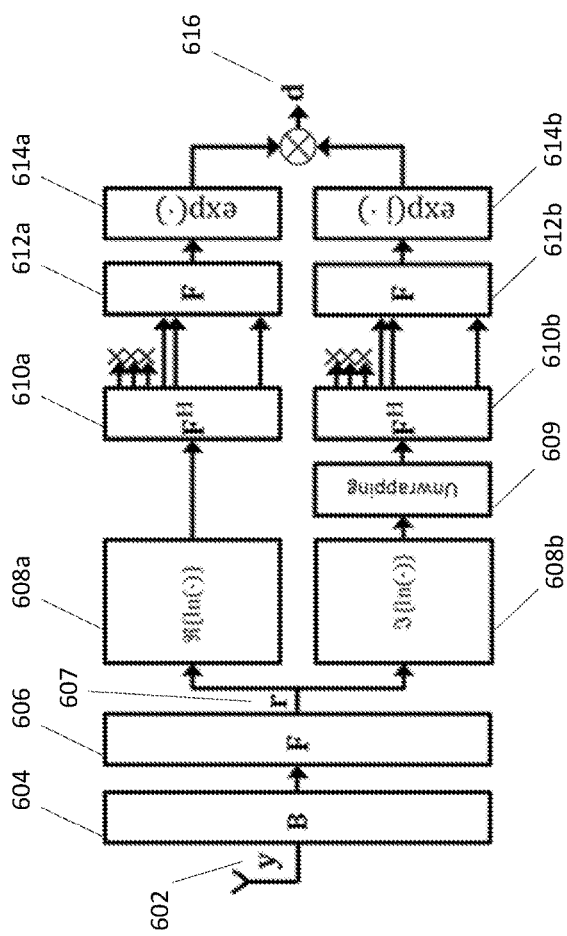
FIGS. 6a and 6b illustrate example receivers.
Figure 6B:
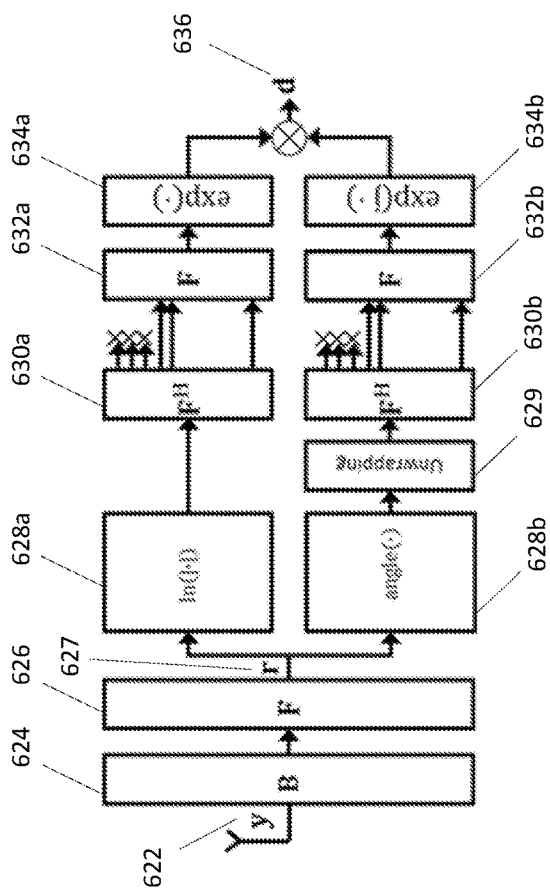

FIGS. 6a and 6b illustrate example receivers. For example, the structures provided in FIG. 6a and FIG. 6b may be implemented in a receiver. A signal may be received by the receiver. For example, the signal y 602 (FIG. 6a) and/or signal y 622 (FIG. 6b) may be received by the respective receiver. If a CP is added (e.g., prepended) to an OFDM symbol, the CP may be removed from the signal y 602 (FIG. 6a) and/or signal y 622 (FIG. 6b). For example, block B 604 (FIG. 6a) and/or block B 624 (FIG. 6b) may remove the CP from the respective signal y 602 (FIG. 6a), 622 (FIG. 6b). Block B may be a matrix B. The signal y may be processed via a Fourier matrix. For example, signal y 602 may be processed via a Fourier matrix 606. Signal y 622 may be processed via Fourier matrix 626.

Signal r may result from signal y being processed via a Fourier matrix. For example, signal r 607 may result from the signal y 602 being processed via the Fourier matrix 606. Signal r 627 may result from the signal y 622 being processed via Fourier matrix 626. As shown in FIG. 6a, signal r 607 may be processed via log components 608a and/or 608b. Log components 608a, 608b may include one or more log operations. The one or more log operations may include a point wise operation, which may be applied to one or more elements of r 607. The base for the log operation may be a number, such as 2, e, or 10. As shown in FIG. 6b, signal 627 may be processed via log component 628a and/or angle component 628b. The angle component 628b may include an angle operation. The angle operation may be an operation that may return the phase of the elements of r 607.

A liftering operation (e.g., removing one or more of the components after the DFT operation, see FIG. 6a and FIG. 6b) may use two-ends of DFT output. The liftering operation may be performed in an unwrapping component. For example, the liftering operation may be performed in the unwrapping component 609 (FIG. 6a) and/or the unwrapping component 629 (FIG. 6b) of the respective receiver. A Fourier matrix with a Hermitian operation may be performed upon signal r 607 and/or signal r 627. For example, the Fourier matrix with Hermitian operation denoted as 610a and/or the Fourier matrix with Hermitian operation denoted as 610b may be performed upon signal r 607. The Fourier matrix with Hermitian operation denoted as 630a and/or the Fourier matrix with Hermitian operation denoted as 630b may be performed upon signal r 627. The signal r 607 (FIG. 6a) and/or the signal r 627 (FIG. 6b) may be processed via a Fourier matrix. For example, the signal r 607 may be processed via Fourier matrix 612a and/or 612b. The signal r 627 may be processed via Fourier matrix 632a and/or 632b. The order of Fourier matrix 612a, 612b and the Fourier matrix with Hermitian operation 610a, 610b may be substituted (e.g., reversed). For example, the order of Fourier matrix 612a may be reversed with the Fourier matrix with Hermitian operation 610a. The order of Fourier matrix 612b may be reversed with the Fourier matrix with Hermitian operation 610b. The order of Fourier matrix 632a, 632b and the Fourier matrix with Hermitian operation 630a, 630b may be substituted (e.g., reversed). For example, the order of Fourier matrix 632a may be reversed with the Fourier matrix with Hermitian operation 630a. The order of Fourier matrix 632b may be reversed with the Fourier matrix with Hermitian operation 630b. The order of Fourier matrix 612a, 612b and Fourier matrix with Hermitian operation 610a, 610b after the log operation may be substituted based on the duality of the time and frequency. The order of Fourier matrix 632a, 632b and Fourier matrix with Hermitian operation 630a, 630b after the log operation may be substituted based on the duality of the time and frequency. The impact of the channel may be circular and/or the low-frequency component may appear on both ends.

The exponent of the signal r 607, 627 may be determined. For example, as shown in FIG. 6a, the exponent of signal r 607 may be determined via component 614a and/or the exponent of signal r 607 may be determined via component 614b. Component 614a, 614b may include one or more exponent operations. For example, component 614a, 614b may include an exponent operation that corresponds to the operation that inverses the log operation. The base used for the exponent operation may be 2, e, or 10 for log 2, ln, or log 10 operations, respectively. Data vector d 616 may result from the operations described herein.

The exponent of signal r 627 may be determined via component 634a and/or the exponent of signal r 627 may be determined via component 634b. For example, as shown in FIG. 6b, the exponent of signal r 627 may be determined via component 634a and/or the exponent of signal r 627 may be determined via component 634b. Components 634a, 634b may include exponent operations that may be applied to an (e.g., each) element of r 627. Data vector d 636 may result from the operations described herein.

Figure 7:
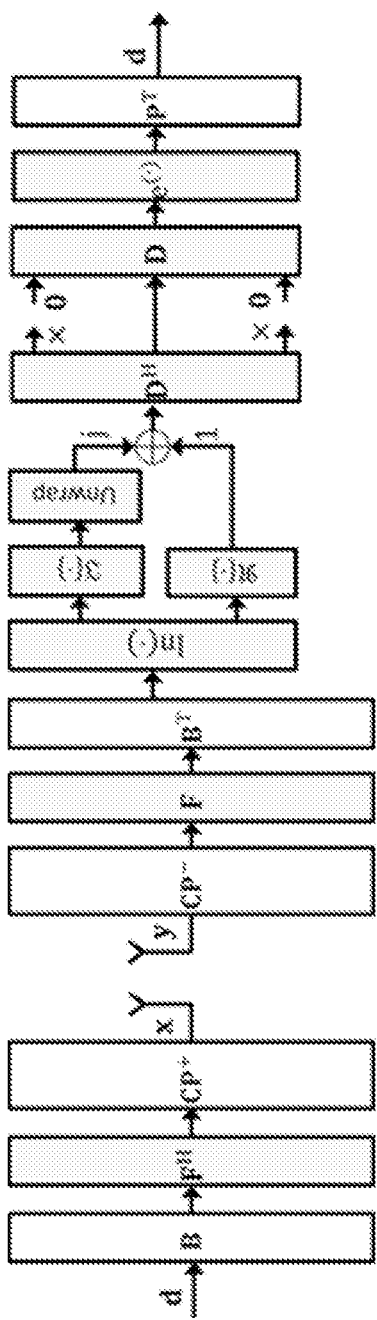
FIG. 7 illustrates an example transmitter and receiver.

FIG. 7 illustrates an example transmitter and receiver. For example, the structures provided in FIG. 7 may be implemented in a transmitter and/or in a receiver. Reduced-complexity Cepstrum-based receivers may be provided. DFT-spread and/or exponential pre-processing may be performed. In an example, the transmitter may use a preprocessing with DFT-spread and/or an exponential operation (e.g., a subsequent exponential operation), for example, to enable less complex receiver structures.

Figure 8:
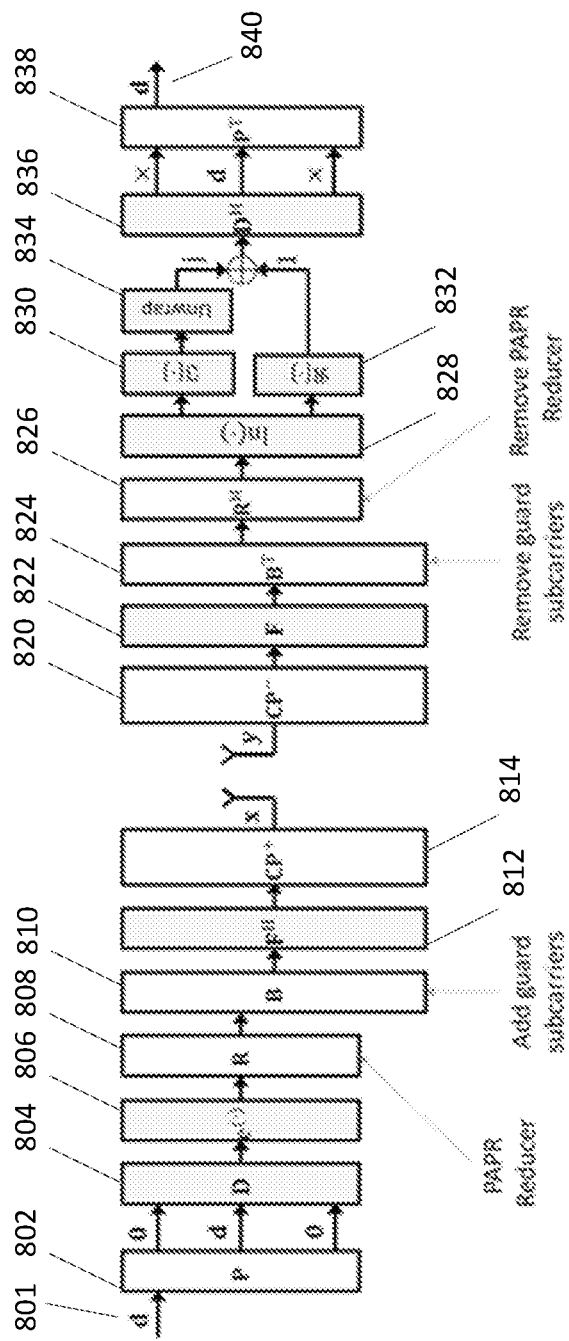
FIG. 8 illustrates an example transmitter and receiver.

FIG. 8 illustrates an example transmitter and receiver. For example, the structures provided in FIG. 8 may be implemented in a transmitter and/or in a receiver. The parts after the liftering operation in FIG. 7 may be moved to the transmitter side, as show in FIG. 8. Data vector d 801 may be received. The transmitter may include a permutation operation P 802. DFT may be performed upon data vector 801, for example, via DFT-spread operation D 804. Exponential precoder operations may be performed upon data vector 801, for example, via exponential component $e^{(\cdot)}$ 806. Two-ends of a DFT-spread block (e.g., before preprocessing with DFT-spread and/or exponential operations) may be nulled. Nulling two-ends of the DFT-spread block may avoid damage (e.g., potential damage) to the data symbol after the liftering operation. The liftering operation may remove the upper-end and the lower-end of the data at the receiver.

A randomizer block (e.g., R 808 in FIG. 8) may be provided. For example, R 808 may be provided after the exponential operation 806. The randomizer block 808 may be used to reduce the peak to average power ratio (PAPR). The PAPR may be reduced by performing a point-to-point multiplication with one or more coefficients. The coefficients may be random coefficients and/or may be developed based on a predefined criterion. Guard subcarriers may be added. For example, guard subcarriers may be added to the coefficients of R via block B 810 (e.g., matrix B). A Fourier matrix with a Hermitian operation may be performed upon the coefficients of R, such as the Fourier matrix with a Hermitian operation denoted as 812. The transmitter may include component 814, which may add a CP.

As shown in FIG. 8, a receiver may be provided. The receiver may consist of operations that are inverse of those provided in the transmitter. The inverse operations at the receiver may be provided in reverse order of operations (e.g., corresponding operations) provided at the transmitter. The receiver may remove the CP, for example, at 820. A Fourier operation may be performed, for example, at 822. The transpose of the matrix B may be performed, at 824. Guard subcarriers may be removed at 824. The coefficients of R may be received and/or may be multiplied with the inverse of R and/or the Hermitian of R, at 826. The PAPR Reducer may be removed, at 826. Log component 828 may include one or more log operations. Log components 830, 832 may include one or more log operations. A liftering operation may be performed in the unwrapping component 834. DFT with a Hermitian operation may be performed at $D^H$ 836. The transpose of the permutation operation P may be performed at 838. The data vector d may be provided, at 840.

Phase modulation may be performed. The channel (e.g., effective channel) may become real-valued. The channel may scale the transmitted data symbols. For example, the channel may scale the transmitted data symbols without impacting the phase of the transmitted data symbols. If phase modulation is used, channel estimation may be bypassed. Data detection may be achieved. For example, data detection may be used by using the phase of the received data symbols.

RS-free non-orthogonal multiple access transmission may be performed. For example, two WTRUs may be transmitting to the eNB on the same subcarriers. A WTRU may transmit a (e.g., one) data symbol and the conjugate of the data vector on two subcarriers (e.g., two adjacent subcarriers). The received signal per WTRU, after combining the signals on two subcarriers, as described herein, may be written as (the subscripts 1 and 2 denote WTRUs 1 and 2):
$R_k+R_k^*=\{(h_{k1}+h^*_{k1})d_{k1}\}+\{(h_{k2}+h_{k2}^*)d_{k2}\}=2R(h_{k1})d_{k1}+2R(h_{k2})d_{k2}$ The real-valued channels $R(h_{k1})$ and $R(h_{k2})$ may be separated from the received signal. For example, the real-valued channels $R(h_{k1})$ and $R(h_{k2})$ may be separated from the received signal via the cepstrum technique, as described herein. The individual user data ($d_{k1}$ and $d_{k2}$) may be decoded (e.g., decoded separately, based on the respective orthogonal codes of the individual user data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A wireless transmit/receive unit (WTRU), the WTRU comprising:
   a memory; and
   a processor, the processor being configured to:
      determine a data vector to be sent;
      generate a padded data vector by attaching one or more zeros to two ends of the data vector;
      generate a preprocessed data vector by performing a Discrete Fourier Transform (DFT)-spread operation on the padded data vector;
      generate a processed data vector by performing an exponential precoder operation and a point-to-point multiplication with one or more random coefficients on the preprocessed data vector; and
      send the processed data vector.

2. The WTRU of claim 1, wherein the processor is further configured to perform a permutation operation on the data vector.

3. The WTRU of claim 1, wherein performing the point-to-point multiplication with one or more random coefficients on the preprocessed data vector reduces a peak to average power ratio (PAPR).

4. The WTRU of claim 1, wherein the one or more random coefficients are based on at least a predefined criterion.

5. The WTRU of claim 1, wherein attaching one or more zeros to two ends of the data vector prevents damage to a data symbol after a liftering operation.

6. The WTRU of claim 1, wherein the processor is further configured to add one or more guard subcarriers to the processed data vector.

7. The WTRU of claim 1, wherein the processor is further configured to add one or more guard subcarriers to the one or more random coefficients.

8. The WTRU of claim 1, wherein the processor is further configured to perform a Fourier matrix with a Hermitian operation upon the one or more random coefficients.

9. The WTRU of claim 1, wherein the processor is further configured to perform a cyclic prefix (CP) operation on the processed data vector.

10. A method for sending a processed data vector, the method comprising:
    determining, at a wireless transmit/receive unit (WTRU), a data vector to be sent;
    generating, at the WTRU, a padded data vector by attaching one or more zeros to two ends of the data vector;
    generating, at the WTRU, a preprocessed data vector by performing a Discrete Fourier Transform (DFT)-spread operation on the padded data vector;
    generating, at the WTRU, a processed data vector by performing an exponential precoder operation and a point-to-point multiplication with one or more random coefficients on the preprocessed data vector; and
    sending, by the WTRU, the processed data vector.

11. The method of claim 10, further comprising performing a permutation operation on the data vector.

12. The method of claim 10, wherein performing the point-to-point multiplication with one or more random coefficients on the preprocessed data vector reduces a peak to average power ratio (PAPR).

13. The method of claim 10, wherein the one or more random coefficients are based on at least a predefined criterion.

14. The method of claim 10, wherein attaching one or more zeros to two ends of the data vector prevents damage to a data symbol after a liftering operation.

15. The method of claim 10, further comprising adding one or more guard subcarriers to the processed data vector.

16. The method of claim 10, further comprising adding one or more guard subcarriers to the one or more random coefficients.

17. The method of claim 10, further comprising performing a Fourier matrix with a Hermitian operation upon the one or more random coefficients.

18. The method of claim 10, further comprising performing a cyclic prefix (CP) operation on the processed data vector.

* * * * *